United States Patent [19]

Harrison

[11] 4,144,909
[45] Mar. 20, 1979

[54] APPARATUS FOR CLOSING SIDE OPENINGS INTO PIPELINES

[75] Inventor: George W. Harrison, Houston, Tex.

[73] Assignee: Team, Inc., Alvin, Tex.

[21] Appl. No.: 590,269

[22] Filed: Jun. 25, 1975

[51] Int. Cl.² .......................................... F16L 55/10
[52] U.S. Cl. ....................................... 138/94; 138/89
[58] Field of Search ............... 138/89, 94; 220/323, 220/325, 327

[56] References Cited

U.S. PATENT DOCUMENTS

| 428,422 | 5/1890 | Skinner | 220/327 |
|---|---|---|---|
| 1,810,621 | 6/1931 | Parks | 220/327 X |
| 2,771,096 | 11/1956 | Ver Nooy | 138/89 |
| 2,988,111 | 6/1961 | Ver Nooy | 138/89 |
| 3,074,591 | 1/1963 | Raver | 220/327 |
| 3,766,947 | 10/1973 | Osburn | 220/327 X |

FOREIGN PATENT DOCUMENTS 333950  1936  Italy ............................................ 220/327

Primary Examiner—Charles E. Phillips
Assistant Examiner—James E. Bryant, III
Attorney, Agent, or Firm—Guy E. Matthews

[57] ABSTRACT

In one exemplar embodiment, a combination closure conduit and closure plug are provided for closing a side opening into a pipeline. The closure stub or conduit is attached to the pipeline around the side opening and has an interior annular shoulder. A closure plug adapted for insertion into the conduit has a projecting peripheral shoulder and provides a first sealing means. A peripheral sealing means disposed on the plug ahead of the peripheral shoulder provides a second means of sealing the plug to the conduit. Locking screws engage a peripheral surface on the top of the plug to lock the plug in place. A by-pass valve is carried by the plug to allow fluid communication through the plug during insertion of the plug.

10 Claims, 3 Drawing Figures

U.S. Patent
Mar. 20, 1979
4,144,909
FIG.1
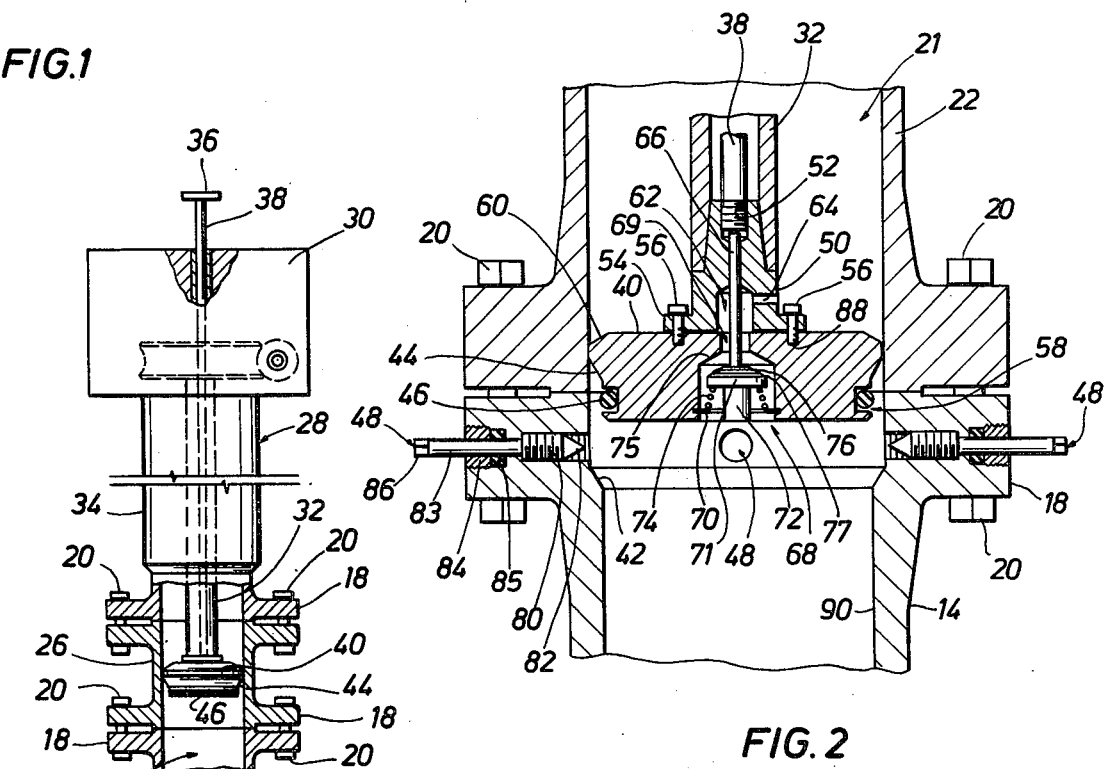
FIG.2
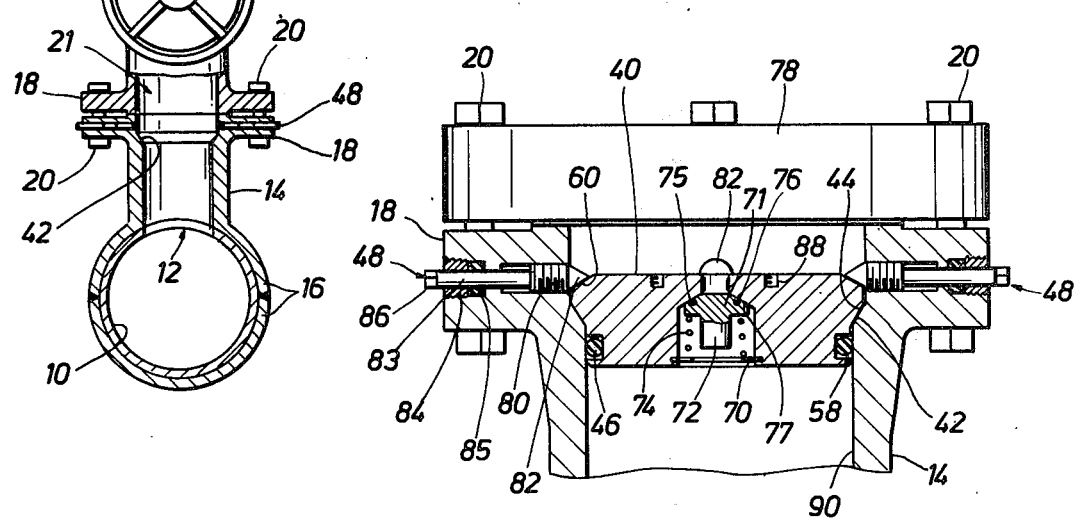
FIG.3

APPARATUS FOR CLOSING SIDE OPENINGS INTO PIPELINES

BACKGROUND OF THE INVENTION

This invention relates to improved apparatus for closing a side opening into a pipeline. It includes an improved closure plug and an improved combination of a closure stub or conduit and a closure plug.

In the operation of pipeline systems, it is often desirable to make connections, install valves, or make repairs in a pipeline without discontinuing the service through the line. This may easily be accomplished by "hot tapping" into the line on each side of the location where a branch line is to be connected, repairs are to be made, or other service performed, installing a by-pass line to transmit fluid normally carried by the line around the section to be operated on and plugging off the by-pass section.

"Hot tapping" on each side of the section usually is accomplished by attaching a closure stub or conduit having a split-T configuration to the outside of the pipeline at each end of the section to be taken temporarily out of service by welding the split-T closure stub to the exterior of the pipeline. A tapping or boring valve, which is normally a gate valve of sufficient size to admit the cutter of a boring machine and pipe plugging apparatus, is attached to the closure stub. A boring machine carrying a rotary cutter is attached to the valve. The tapping valve is then opened and the cutter is advanced to cut a side opening into the pipe which is withdrawn through the valve, and the valve is again closed. Boring in this manner prevents loss of any appreciable quantity of fluid carried by the pipeline since the boring machine is equipped with a fluid-tight housing in which the cutter operates. Plugs are then inserted into the opposite end of the section to be plugged off, and a by-pass line is connected through the tapping valves to the side openings into the line. The valves are then opened so that other services can continue while repairs are made in the plugged-off section. After repairs are made, the gate valves are closed, the by-pass line is removed, the closure stubs are plugged below the valves, and the valves are removed.

In the prior art, side openings through a pipeline have been closed by locking a plug within the pipe stub by screw threads, a fluid-tight seal being obtained by the final seating of the tapered threads. However, the torque required to turn the plug was excessive, and it was also found that the welding of the conduit or pipe stub to the line often resulted in warpage which interferred with threading of the plug into the conduit. Other closure plugs are disclosed in patents to B. Ver Nooy, namely U.S. Pat. Nos. 2,771,096, 2,988,111 and 3,155,116. However, all of these closure plugs use some type or form of a retainer ring that seats into a groove in the pipe stub or conduit and utilize expensive and complex segmented or split rings, or utilize screws or screw plugs, which must be inserted through the closure stub or conduit into an annular groove around the periphery of the closure plug. The seating of such screw plugs or rings necessitates extremely accurate placement of the closure plug, down to fractions of an inch, for safe locking of the closure plug. Such precision is often hard to obtain in the field, and improper locking often results.

Accordingly, one primary feature of the present invention is to provide a simple apparatus for closing a side opening into a pipeline having a positive seating and locking placement.

Another feature of the present invention is to provide a closure stub or conduit that has an annular shoulder disposed around its interior for positive seating and support and placement of a closure plug.

Yet another feature of the present invention is to provide a closure plug adapted for insertion into a conduit and having an annular seating surface disposed about its periphery for contacting the interior shoulder of the conduit and providing a fluid-tight seal therebetween.

Still another feature of the present invention is to provide a closure plug adapted for insertion into a conduit and having a peripheral sealing means disposed about the periphery of the plug forward of an annular seating surface for sealingly engaging the interior of the conduit and forming another fluid-tight seal therebetween.

Still another feature of the present invention is the provision of a by-pass valve means disposed in the plug adapted to be opened to permit fluid communication through the plug during insertion of the plug into the conduit, and to be closed after insertion to prevent such fluid communication through the plug.

Another feature of the present invention is to provide a plurality of locking screws or plugs disposed radially in the conduit and adapted upon retraction to permit passage of the plug transversely of the screws and upon insertion to permit the inner ends of the screws to engage the upper peripheral surface of the plug for locking the plug in place in the conduit.

SUMMARY OF THE INVENTION

The present invention remedies the problems of the prior art by providing an apparatus for closing a side opening into a pipeline, comprising a conduit attached to the exterior of the pipeline around the side opening into the pipe and having an annular shoulder formed around its interior. A closure plug is adapted for insertion into the conduit and has an annular seating surface disposed about its periphery for sealingly seating against the shoulder of the conduit for forming a first fluid-tight seal therebetween. The plug also has a peripheral sealing means disposed about the periphery of the plug forward of the annular seating surface for sealingly engaging the interior of the conduit for forming a second fluid-tight seal therebetween, and the closure plug further has an annular locking surface disposed about its upper periphery. A plurality of screws or plugs are disposed radially in the conduit and are adapted upon retraction to permit passage of the closure plug transversely of said screws in the conduit and upon insertion to permit the inner ends of the screws to engage the annular surface disposed about the upper periphery of the closure plug for locking the plug in place in the conduit. A by-pass valve means is disposed in the plug adapted to be opened to permit fluid communication between the pipeline and a sealed chamber above the conduit during insertion of the plug and adapted to be closed after insertion of the plug to prevent fluid communication through the closure plug.

BRIEF DESCRIPTION OF THE DRAWINGS

In order that the manner in which the above-recited advantages and features of the invention are obtained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope, for the invention may admit to further equally effective embodiments.

In the drawings:

FIG. 1 is an elevational view, partly in cross-section, of a pipeline with a side opening therein and a boring machine mounted on the line over the side opening, with the apparatus of the present invention in position to be inserted within a pipe conduit connecting the pipeline and machine for closing the side opening.

FIG. 2 is a detailed cross-sectional view of the pipe conduit and closure plug showing the plug being inserted into position to be locked in the conduit.

FIG. 3 is a detailed cross-sectional view of the conduit and closure plug showing the plug locked within the conduit, and a blind closure plate installed over the plug and conduit.

DETAILED DESCRIPTION OF THE PREFERRED EMBODIMENTS

Referring now to FIG. 1, there is shown a pipeline 10 adapted to transport pressurized fluids having a side opening 12 through the wall of the pipeline. A closure stub or conduit 14 is welded over the side opening 12 in pipeline 10 by means of split-T sections 16. The closure stub 14 forms a conduit connecting the interior of pipeline 10 and a chamber 23 which is defined by the passages through a valve 22 mounted on the closure stub 14 and operated by actuating hand wheel 24, a reducing nipple 26 on the valve, and the lower end of a boring machine 28 mounted on the nipple 26. As shown, the chamber 23 permits the insertion of a closure plug 40 and the longitudinal movement of plug 40 through chamber 23, the interior of valve 22, the lower chamber of valve 21 and into the interior of the conduit 14. The closure plug 40 is attached to a boring bar 32, a part of boring machine 28, which allows longitudinal insertion of the closure plug 17 through chamber 23, valve 22, chamber 21, and into the interior of conduit 14. The closure stub or conduit 14, valve 22, reducing nipple 26, and boring machine 28 are each provided with flanged ends 18 adapted to be bolted to each other by means of bolts 20 to form a fluid-tight seal therebetween.

Apparatus such as a conventional boring machine 28 may be used to drill the side opening 12 in pipeline 10, insert a tool, pipeline closure plug, or other necessary apparatus through the side opening and into the pipeline, and subsequently move the closure plug 40 into locking position within the conduit 14 for closing the side opening in the pipeline and forming a fluid-tight seal. Such a conventional boring machine might comprise an upper compartment 30 which houses a drive mechanism for rotatably driving the boring bar 32 and has a depending sleeve 34 through which the boring bar 32 is inserted and guides the bar for longitudinal and rotary movement. Details of the attachment of the boring bar 32 to closure plug 40 will be hereinafter further described.

Closure stub or conduit 14 has a tapered annular shoulder 42 around its interior and spaced from flange 18. Jack screws 48 radially project through the flange 18 of conduit 14 for purposes to be hereinafter further described. Plug 40 carries a tapered annular shoulder or seating surface 44 disposed about its periphery for sealingly mating with the conduit shoulder 42, as will be hereinafter further described. Closure plug 40 also carries a peripheral sealing means 46 disposed about the periphery of plug 40 below or forward of the annular shoulder 44 for sealingly engaging the interior of conduit 14 for forming a fluid-tight seal therebetween, as will be hereinafter further described. The sealing means 46 may conveniently comprise an annular fluid energized seal of the O-ring type carried by and around the plug 40.

As may be seen, the chamber 23 is fluid-tight, and when the plug 40 is in the position shown in FIG. 1, prior to locking the plug in conduit 14, the pressure in chamber 23 will be that of pipeline 10.

Referring now to FIGS. 2 and 3, insertion of plug 40 through chamber 21 for sealing engagement with conduit 14 is shown. The boring bar 32 has a rod 38 disposed axially therethrough, and has an actuating handle 36 at one end extending from compartment 30 of boring machine 28 (see FIG. 1). Rod 38 has a threaded end 52 which is attached to a conically flared plug holder 50. Plug holder 50 has a flanged ring 54 for seating on the top surface of plug 40 and through which screws 56 mate with screw sockets 88 in plug 40 for removably attaching plug holder 50 to plug 40 during the insertion of the plug into conduit 14.

Plug 40 has an annular seating surface or shoulder 44 disposed about its periphery, and an annular recess or groove 58 disposed about the periphery of plug 40 forward of the annular shoulder 44 for receiving and retaining an O-ring seal 46. The plug 40 also carries an upwardly facing annular surface 60 disposed about its upper periphery for purposes to be hereinafter further described.

Plug 40 carries a by-pass valve means disposed in the plug and adapted to be opened to permit fluid communication between pipeline 10 and chambers 21 and 23 through plug 40 during insertion of the plug and to be closed after insertion of the plug to prevent fluid communication through plug 40. The by-pass valve means comprises a valve plug or head 71 having a depending stem 72 inserted into a first passageway 68 in plug 40 communicating with the lower face of the plug, and having a seating surface 77 adapted for mating with the shoulder or seating surface 75 which is disposed at the juncture of the first passageway 68 and a second passageway 69 disposed in plug 40 and communicating with the top surface of the plug. A retainer ring or washer 70 is disposed in the plug 40 transversely of first passageway 68 and has a central opening therethrough for allowing reciprocal movement of the valve stem 72 therethrough. A spring 74 is provided for engaging the base of the valve plug or head 71 and the retainer ring or washer 70 for biasing the valve head seating surface 77 into seating engagement with the seating surface 75 at the juncture of the first and second passageways 68, 69, respectively. An actuating rod 66 extending through plug holder 50 contacts the nose of the valve head 71, and upon actuation of handle 36, rod 38 may be moved downwardly, thereby forcing actuating rod 66 downwardly and applying a downward force against valve head 72, thus compressing spring 74 and opening passageways 68 and 69 for fluid communication through the plug. Fluid in the interior of conduit 14 may then move through passageways 68, 69 chamber 62 of plug holder 50, and then through passageway 64 into the interior of chambers 21, 23. Thus it may be seen that the valve plug 71 is adapted for reciprocal movement in the first passageway 68 for opening and closing fluid communication between the first passageway 68 and the second passageway 69. The valve head 71 carries an O-ring type seal 76 in an annular groove disposed in the seating surface 77 of valve head 71 for forming a fluid-tight seal between the seating surface of valve head 71 and the shoulder 75 within plug 40.

The closure plug 40 is inserted by means of rod 32 through chamber 21 and into the interior of conduit 14, until the plug shoulder 44 seats against the conduit annular seating surface or shoulder 42, thus forming a first fluid-tight seal therebetween. As shown in FIG. 2, while plug 40 is being inserted through chamber 21 into the interior of conduit 14, the actuating rod 66 applies a force through second passageway 69 against valve head 71, thus opening the by-pass valve and allowing fluid communication from the interior of conduit 14 through the by-pass valve and plug 40 and plug holder 50 into the interior of chambers 21, 23. When plug 40 seats with conduit 14 as hereinabove described, the annular fluid energized O-ring seal 46 carried by groove 58 contacts the interior surface 90 of conduit 14, thereby forming a second fluid-tight seal between plug 40 and conduit 14.

Actuating screws 48 comprise a threaded plug end 80 and a stem portion 83 having an exterior end 86 adapted for gripping by a conventional tool for turning the screw and either inserting the screw into the interior of conduit 14 or withdrawing the screw from the interior of conduit 14. Stem 83 projects through a threaded sleeve 84 which retains a packing or sealing means 85 for forming a fluid-tight seal between the screw stem 83 and conduit 14. The interior end 82 of plug or screw 48 has a conically tapered surface which, when shoulder 44 of plug 40 is seated against shoulder 42 of conduit 14 registers with the upwardly facing annular surface 60 around the periphery of plug 40 for locking the plug in place in conduit 14. A plurality of screws 48 may be utilized, the number varying with the diameter of conduit 14. Screws 48 provide a locking means that prevents the dislodgment or blow-out of plug 40 due to the pressure differential developed across the plug after it has been seated and locked.

After seating of plug 40 and locking thereof by means of the screws or plugs 48, rod 38 is withdrawn to allow actuating rod 66 to move upwardly and allow the by-pass valve to close, thus closing fluid communication through plug 40 from the interior of conduit 14 to chamber 21. Upon the closing of the by-pass valve, a pressure differential builds up across plug 40 tending to force plug 40 upwardly toward chamber 21 against the retaining or locking force of the screws 48. The plug holder 50 may be disengaged from plug 40 by removing screws 56 and withdrawing the tool from chamber 21. After plug 40 has been seated, valve 22, reducing nipple 26, and boring machine 28 may be removed and a blind closure plate 78 installed to seal the end of closure stub or conduit 14. The plate 78 may be attached to conduit flange 18 by conventional bolts 20.

Numerous variations and modifications may obviously be made in the structure herein described without departing from the present invention. Accordingly, it should be clearly understood that the forms of the invention herein described and shown in the figures or the accompanying drawings are illustrative only and not intended to limit the scope of the invention.

What is claimed is:

1. Apparatus for closing a side opening into a pipeline, comprising a conduit adapted to be attached to the exterior of the pipeline around the side opening into the pipe, said conduit having a tapered annular shoulder around its interior, a plug adapted for insertion into said conduit and having a tapered annular seating surface disposed about its periphery for sealingly mating with said tapered shoulder of said conduit for forming a first fluid-tight seal therebetween, said plug having a peripheral sealing means disposed about said periphery of said plug forward of said annular seating surface for sealingly engaging the interior of said conduit for forming a second fluid-tight seal therebetween, said plug further having an annular surface disposed about its upper periphery, and a plurality of screws disposed in said conduit and having a fluid-tight seal disposed therebetween and adapted upon retraction to permit passage of said plug transversely of said screws and upon insertion to permit the inner ends of said screws to engage said annular surface disposed about the upper periphery of said plugs for locking said plug in place in said conduit.

2. The apparatus as described in claim 1, further including by-pass valve means disposed in said plug and adapted to be opened to permit fluid communication through said plug during insertion of said plug and to be closed after said insertion to prevent said communication.

3. The apparatus as described in claim 1, wherein said peripheral sealing means disposed about said plug forward of said annular seating surface comprises an annular fluid energized seal of the O-ring type carried by and around the plug.

4. The apparatus as described in claim 2, wherein said by-pass valve means comprises a valve plug insertable into a first passageway communicating with the lower face of said plug, said first passageway communicating with a second passageway which communicates with the upper face of said plug, the juncture of said first and second passageways having a seating surface for mating with a seating surface of said valve plug, said valve plug adapted for reciprocal movement in said first passageway for opening and closing communication between said first and second passageways, a retainer ring disposed in said plug transversely of said first passageway and having an opening therethrough for allowing said reciprocal movement of said valve plug therethrough, spring means for engaging said valve plug and said retainer ring for biasing said valve plug seating surface into seating engagement with said seating surface at the juncture of said first and second passageways, and permitting said valve plug to be disengaged from seating contact with said passageway seating surface upon application of force against said valve plug through said second passageway, and sealing means disposed about said annular seating surface on said valve plug for sealingly engaging said juncture seating surface of said passageways for forming a fluid-tight seal therebetween.

5. The apparatus described in claim 1, wherein the inner ends of said screws disposed in the interior of said conduit have conical shaped surfaces, the surfaces of which seat with said annular surface disposed about the upper periphery of said plug.

6. Apparatus for closing a side opening into a pipeline, comprising
 a conduit adapted to be attached to the exterior of the pipeline around the side opening into the pipe, said conduit having a tapered annular shoulder around its interior,
 a plug adapted for insertion into said conduit and having a tapered annular shoulder disposed about its periphery for sealingly mating with said tapered annular conduit shoulder for forming a first fluid-tight seal therebetween, said plug having a peripheral annular fluid energized seal of the O-ring type carried by and around said plug for sealingly engaging the interior of said conduit for forming a second fluid-tight seal therebetween, said plug having an annular surface disposed about its upper periphery, said plug further carrying a by-pass valve means adapted to be opened to permit fluid communication therethrough during insertion of said plug into said conduit, and to be closed after said insertion to prevent said communication therethrough, and
 a plurality of screws disposed in said conduit and adapted upon retraction to permit passage of said plug transversely of said screws and upon insertion to permit the inner ends of said screws to engage said annular surface disposed about the upper periphery of said plug for locking said plug in place in said conduit.

7. The apparatus as described in claim 6, wherein said by-pass valve means comprises
 a valve body comprising a valve head and an elongated depending valve stem insertable into a first passageway communicating with the lower face of said plug, said first passageway communicating with a second passageway which communicates with the upper face of said plug, the juncture of said first and second passageways having a shoulder for mating with a seating surface of said valve head for forming a fluid-tight seal therebetween, said valve body adapted for reciprocal movement in said first passageway for opening and closing fluid communication between said first and second passageways,
 an annular washer disposed in said plug transversely of said first passageway for allowing reciprocal movement of said valve stem through a central opening therein,
 spring means disposed in said first passageway engaging said washer and the lower surface of said valve head for biasing said valve head seating surface into seating engagement with said passageway shoulder and permitting said valve head to be disengaged from seating contact with said passageway shoulder.

8. The by-pass valve means as described in claim 7, including sealing means disposed about said annular seating surface on said valve head for sealingly engaging said passageway shoulder for forming a fluid-tight seal therebetween.

9. The apparatus as described in claim 6, wherein said screws have a fluid-tight sealing means disposed between said screws and said conduit.

10. The apparatus as described in claim 6, wherein the inner ends of said screws disposed in the interior of said conduit have conically tapered surfaces which seat with said annular surface disposed about the upper periphery of said plug.

* * * * *